H. O. SCRANTON.
WINDROWING MACHINE.
APPLICATION FILED JAN. 10, 1919.
1,323,498.
Patented Dec. 2, 1919.
3 SHEETS—SHEET 2.
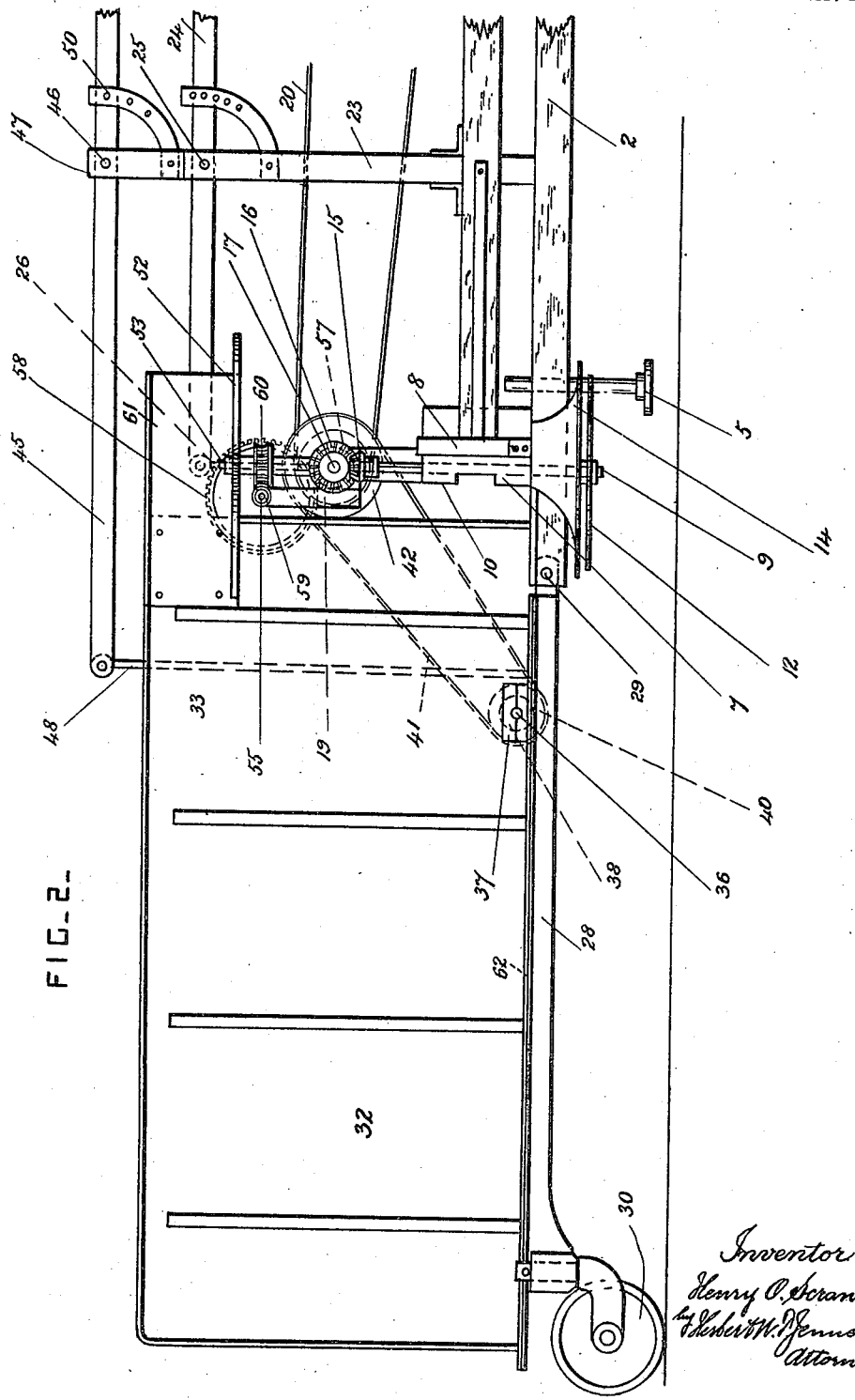

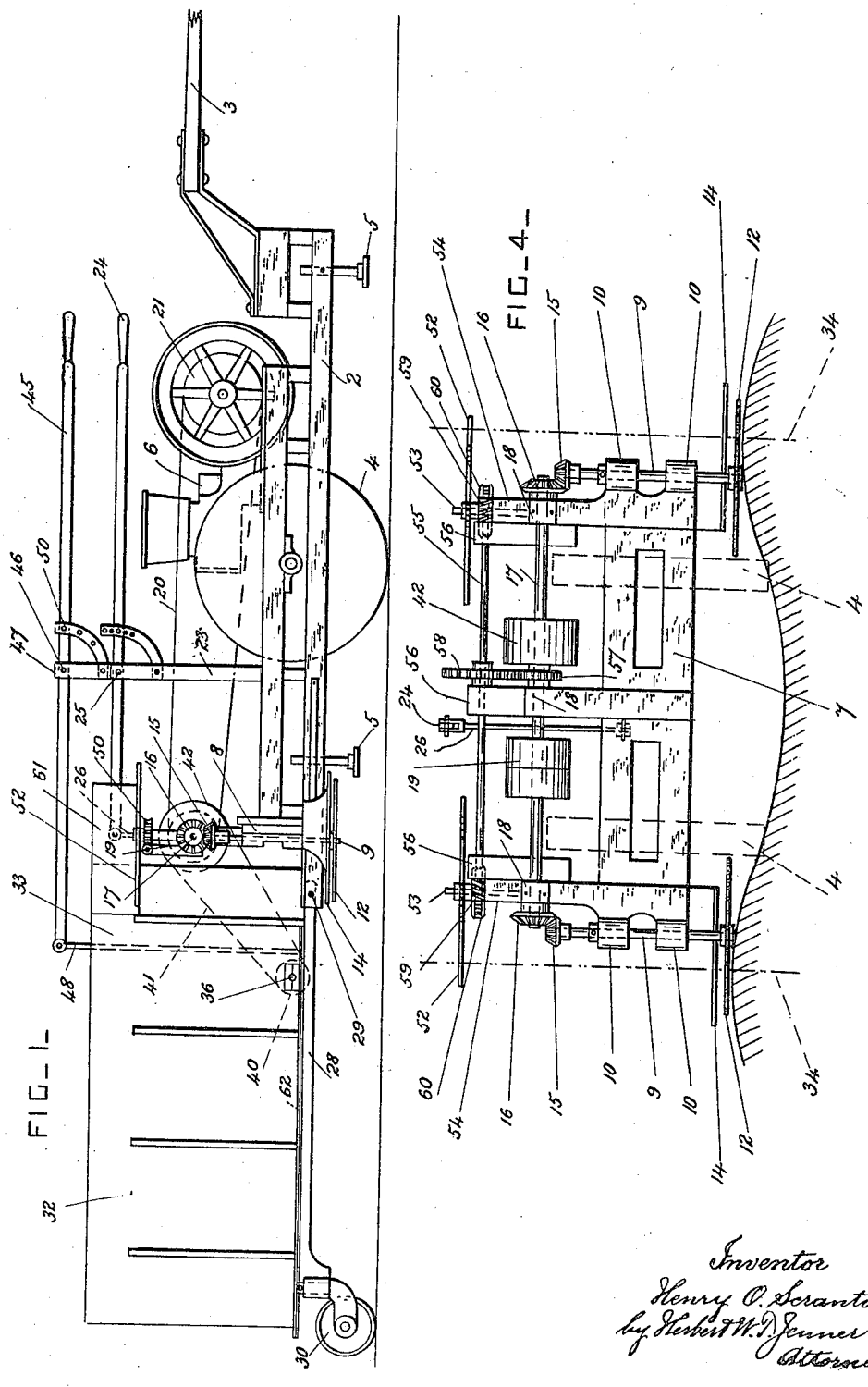

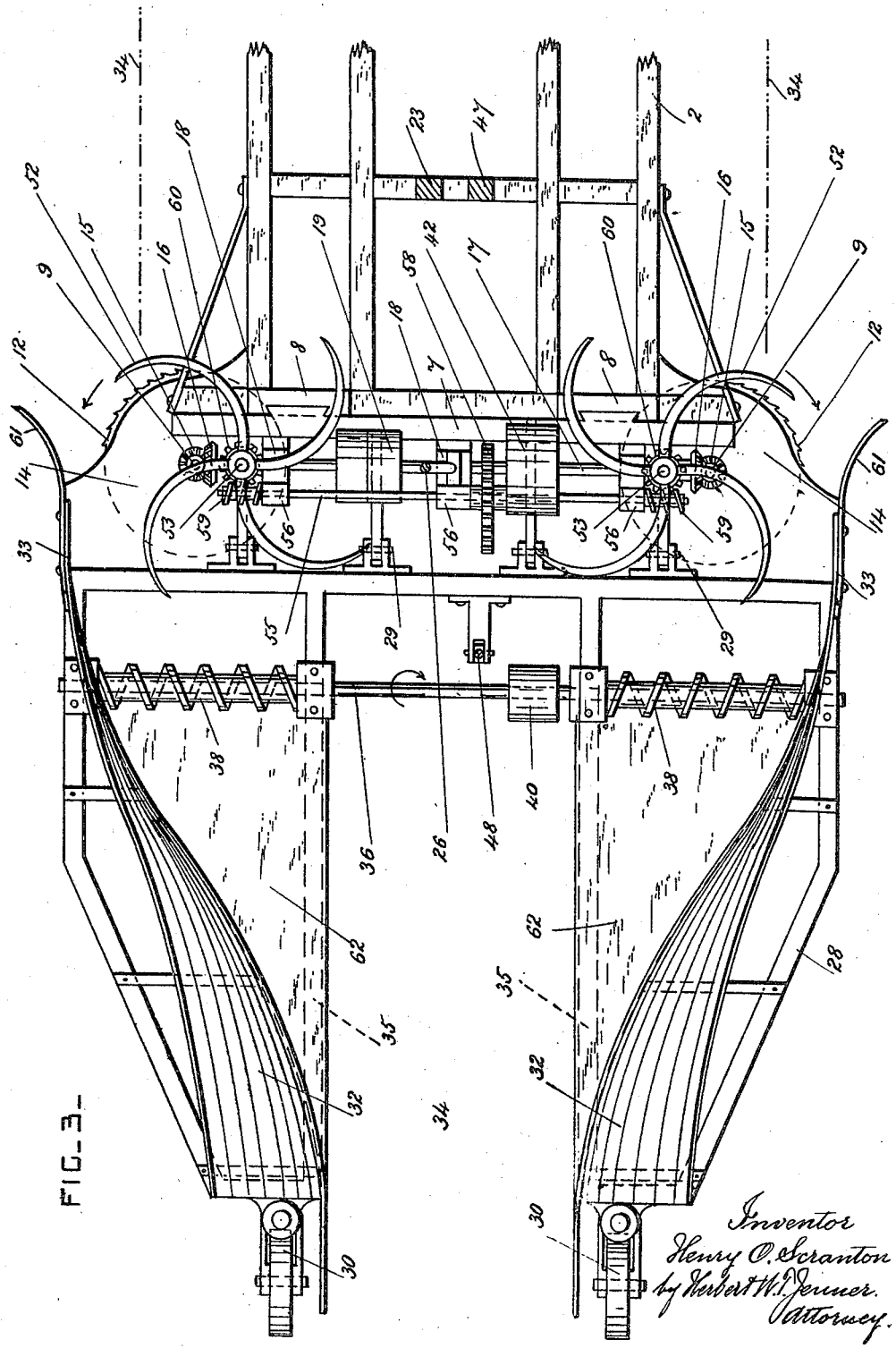

UNITED STATES PATENT OFFICE.

HENRY OSBERT SCRANTON, OF JEANERETTE, LOUISIANA.

WINDROWING-MACHINE.

1,323,498.   Specification of Letters Patent.   Patented Dec. 2, 1919.

Application filed January 10, 1919.   Serial No. 270,488.

*To all whom it may concern:*

Be it known that I, HENRY O. SCRANTON, a citizen of the United States, residing at Jeanerette, in the parish of Iberia and State of Louisiana, have invented certain new and useful Improvements in Windrowing-Machines, of which the following is a specification.

This invention relates to windrowing machines specially adapted for use in harvesting sugar cane, but which may be used in connection with other growing crops, such as corn; and it consists in the novel construction and combination of the parts hereinafter fully described and claimed whereby the cane is cut down on each side of the machine and is deposited longitudinally on the ground between the rows of plants.

In the drawings, Figure 1 is a side view showing an outline of the complete machine. Fig. 2 is a side view of the cutting and windrowing devices, drawn to a larger scale. Fig. 3 is a plan view of the parts shown in Fig. 2. Fig. 4 is an end view of the cutting and tilting mechanism.

This machine is specially useful when the temperature approaches the freezing point, as it enables the cane to be cut down expeditiously and laid in straight longitudinal rows or piles between the rows of plants with the tops covering the stalks and protecting them from the cold.

A truck or cart 2 is provided, and it has a suitable draft attachment 3 at its front end, such as shafts to which a mule can be harnessed. The machine may however be drawn along or propelled between the rows of plants by any other approved means. This truck is preferably mounted on two ground wheels 4 arranged at about the middle of its length. These ground wheels are of any approved make, and runners of any suitable construction can be used in place of ground wheels, or they can be secured to the ground wheels, when the ground is soft and swampy.

The end portions of the truck are provided with vertically adjustable legs 5 for the purpose of holding it level when it is disconnected from the windrowing devices.

A motor 6 of any approved sort, such as a gasolene engine, is mounted on the truck, and is preferably arranged in front of the axle of the ground wheels. The framing of the truck is suitably braced together, and is made as strong and as rigid as possible.

The cutting mechanism is arranged in a frame 7 which is slidable vertically in guides 8 arranged at the rear part of the truck. Two vertical cutter shafts 9 are provided, and are journaled in bearings 10 on the frame 7, and are arranged one on each side of the machine. Saws 12, or other similar circular cutters, are secured on the lower end portions of the shafts 9, and have stationary saw guards 14 arranged above them. Beveled toothed wheels 15 are secured on the upper end portions of the shafts 9, and gear into beveled toothed wheels 16 secured on a horizontal shaft 17. The shaft 17 is journaled in bearings 18 on the frame 7, and it extends across the machine. A belt pulley 19 is secured on the shaft 17, and is driven by a belt 20 from a pulley 21 on the motor. The saws may however be driven from the motor by any other approved driving mechanism.

The frame 7 and the saws are raised and lowered by a lever 24 which is pivoted by a pin 25 to a support 23 on the truck, and is connected to the frame by a connecting-rod 26. Any other approved devices may however be used for adjusting the height of the saws above the ground, and any approved locking device can be used for securing the saws or the saw frame against vertical movement after their position has been adjusted.

The windrowing devices are mounted on a frame 28 which is pivotally connected with the rear end portion of the frame of the truck by pins 29. The rear end portion of the windrower frame 28 is preferably supported from the ground by pivoted caster wheels 30, but any other suitable support can be used. Two curved guides 32 are secured to the frame 28, and are arranged one on each side of the machine. These guides 32 are preferably formed of thin sheet metal, and their front end portions 33 are substantially vertical, and are arranged at a sufficient distance apart to straddle the saws and also two rows of standing plants which are indicated by the dotted lines 34. The middle and rear portions of the guides 32 are shaped something like the mold board of a plow. They converge toward the center line of draft of the machine, and are wider apart at their tops than at their lower parts. The windrower frame 28 has a longitudinal opening 34 between its two middle bars 35, and these bars are spaced to suit the width desired for arranging the cane after cutting it.

A shaft 36 is journaled in bearings 37 on the frame 28, and is arranged horizontally at its front end portion, between the guides 32 and at their lower parts. Spiral conveyers 38 are secured on the end portions of the shaft 36, and are formed right and left hand as shown.

A belt pulley 40 is secured on the middle part of the shaft 36, and is driven by a belt 41 from a pulley 42 on the cross shaft 17. Any other suitable driving mechanism may however be used for revolving the spiral conveyers.

In order that the windrowing machine may be able to make sharp turns, the truck 2 is preferably mounted on a single pair of ground wheels, and a lever 45 is provided for raising the caster wheels 30 of the windrower frame clear of the ground. This lever is pivoted by a pin 46 to a support 47 on the truck, and its front end is operated by a man on the front part of the truck. The rear end of the lever 45 is connected to the frame 20 by rod 48. Stops 50 are provided to prevent the pivot joint from sagging or dropping when the hand lever 45 is released, but any other approved means may be used for maintaining the relative positions of the windrowing frame and the truck.

The revolving cutters are driven by the motor, and they cut down the cane as the machine is drawn along. The cane falls rearwardly of the truck by gravity against the guide plates 32. The top portions of the cane are deposited centrally of the machine by the guide plates, and the stalks are moved laterally by the spiral conveyers so that they drop through the space or opening 34.

In order to assure that all the plants will fall rearwardly when cut, spider wheels 52 are provided, and are secured on vertical shafts 53 journaled in bearings 54 on the saw frame, and arranged one on each side of the machine adjacent to the saw shafts. The curved arms of these spider wheels engage with the plants, and tilt them rearwardly as the spider wheels are revolved. The spider wheels are revolved from the cross shaft 17 by any suitable intermediate driving mechanism. A countershaft 55 is journaled in bearings 56 on the saw frame parallel to the cross shaft 17, and is driven therefrom by toothed wheels 57 and 58. The counter-shaft 55 has worms 59 secured on its end portions, which drive worm wheels 60 secured on the vertical shafts 53 of the spider wheels.

The circular saws do not require to be moved to any great extent to adjust them sufficiently above the ground, and the movement of the saw frame does not interfere with the working of the driving belts, but any suitable belt tighteners or take up devices can be used if necessary to compensate for the movements of the saw frame.

If a smaller machine is desired same can be constructed with a single saw on one side, and a windrowing device arranged to the rear of it as hereinbefore described.

In a large machine provided with two saws, I do not restrict myself to an adjusting device which raises and lowers both saws simultaneously, as it is sometimes desirable to adjust each saw separately.

Guide plates 61 are preferably secured to the tops of the guides 32 adjacent to the spider wheels; and horizontal plates 62 are secured to the windrower frame at the bottoms of the guides 32 on each side of the opening 34.

The plants ordinarily fall on the ground, but they can be dropped upon the receiving portion of a stripping machine, if desired, arranged in the discharge space 34.

The saw guards 14 are substantially horizontal plates which are secured to the frame 7, and their use enables each row of cane to be cut by a single rotary toothed cutter or saw. The front end portions 33 of the curved plant guides project forwardly of the bottom plates 62 and over the saw guards 14, and the spiral conveyers 38 are arranged in front of the curved rear and middle portions of the plates 32 at the front ends of the bottom plates 62.

What I claim is:

1. In a windrowing machine, a truck, cutting devices arranged at the rear end portion of the said truck, a windrowing frame pivoted to the truck, a bottom plate secured to the windrowing frame to the rear of the cutting devices, and a guide plate having a substantially vertical front end portion which projects forwardly of the bottom plate, said guide plate having middle and rear portions which are curved inwardly and rearwardly toward the center line of draft and which are also curved downwardly and inwardly from top to bottom and which extend along the said bottom plate.

2. In a windrowing machine, a truck, a rotary saw arranged at the rear end portion of the said truck, a saw guard plate arranged above the said saw, a windrowing frame pivoted to the truck, a bottom plate secured to the windrowing frame to the rear of the saw, and a guide plate having a substantially vertical front end portion which projects forwardly of the said bottom plate and over the saw guard plate, said guide plate having middle and rear portions which are curved inwardly and rearwardly toward the center line of draft and which are also curved downwardly and inwardly from top to bottom and which extend along the said bottom plate.

3. In a windrowing machine, a truck, two rotary saws arranged one on each side of the rear part of the truck, a saw guard plate arranged above each said saw, a windrowing frame pivoted to the truck, guide plates secured to the windrowing frame, said guide plates having curved converging rear and middle parts and substantially vertical front end portions which project over the saw guard plates, and bottom plates supported by the windrowing frame at the bottoms of the converging middle and rear parts of the guide plates leaving a discharge opening at the center line of draft.

4. In a windrowing machine, a truck, two rotary saws arranged one on each side at the rear part of the truck, a saw guard plate arranged above each said saw, a windrowing frame pivoted to the truck, guide plates secured to the windrowing frame, said guide plates having converging rear and middle parts and substantially vertical front end portions which project over the saw guard plates, bottom plates supported by the windrowing frame at the bottoms of the converging middle and rear parts of the guide plates leaving a discharge opening at the center line of draft, and right and left hand spiral conveyers arranged at the front ends of the said bottom plates and operating to move the lower end portions of the cut plants toward the center line of draft.

5. In a windrowing machine, a truck, two rotary saws arranged one on each side of the rear part of the truck, a saw guard plate arranged above each said saw, a windrowing frame pivoted to the truck, guide plates secured to the windrowing frame, said guide plates having converging rear and middle parts and substantially vertical front end portions which project over the saw guard plates, bottom plates supported by the windrowing frame at the bottoms of the converging middle and rear parts of the guide plates leaving a discharge opening at the center line of draft, and rotary spiders supported over the said saws in front of the said bottom plates and operating to tilt the upper end portions of the cut plants rearwardly and inwardly toward the center line of draft.

6. In a windrowing machine, a truck provided with a vertical guide at its rear portion, a frame slidable in the said guide, a vertical saw shaft journaled in the said frame, a circular saw secured on the saw shaft, a saw guard plate secured to the said frame above the saw, hand lever mechanism for sliding the said frame in its guide, and a windrowing frame connected to the truck and provided with a guide plate arranged to the rear of the said saw and operating to guide the cut plants inwardly toward the center line of draft.

7. In a windrowing machine, a truck, two rotary saws arranged one on each side of the rear part of the truck, a saw guard plate arranged above each said saw, a windrowing frame pivoted to the truck, means for normally supporting the rear end portion of the windrowing frame from the ground, lever mechanism carried by the truck and adapted to raise the windrowing frame clear of the ground, and curved converging guide plates secured to the windrowing frame and provided with substantially vertical front end portions which project over the said saw guard plates.

8. In a windrowing machine, a truck provided with vertical guides at its rear end portion, a frame slidable in the said guides and extending across the truck, two rotary saws secured on vertical saw shafts which are journaled in the said frame, a guard plate secured to the said frame above each said saw, a windrowing frame connected to the truck and provided with guide plates arranged to the rear of the said saws and operating to guide the cut plants inwardly toward the center line of draft, a single driving shaft journaled in the slidable frame and extending across the truck, and beveled toothed wheels connecting the end portions of the driving shaft with the two saw shafts.

In testimony whereof I have affixed my signature.

HENRY OSBERT SCRANTON.